United States Patent [19]
Brown et al.

[11] Patent Number: 5,937,700
[45] Date of Patent: Aug. 17, 1999

[54] EXTERNALLY INSTALLABLE BALL RETURN CROSSOVER SYSTEMS FOR BALL NUT AND SCREW ASSEMBLIES AND METHODS OF CONSTRUCTING AND INSTALLING THEM

[75] Inventors: Mark P. Brown, Florence, S.C.; David A. Sepesi, Whitmore Lake, Mich.; William E. Welling; James A. Babinski, both of Saginaw, Mich.

[73] Assignee: Thomson Saginaw Ball Screw Company, L.L.C., Saginaw, Mich.

[21] Appl. No.: 09/181,979

[22] Filed: Oct. 29, 1998

Related U.S. Application Data

[60] Provisional application No. 60/085,164, May 12, 1998.

[51] Int. Cl.$^6$ .................................................. F16H 27/02
[52] U.S. Cl. ........................................ 74/89.15; 74/459
[58] Field of Search ................................ 74/89.15, 459, 74/424.8 R

[56] References Cited

U.S. PATENT DOCUMENTS

| | | |
|---|---|---|
| 3,580,098 | 5/1971 | Good . |
| 3,815,435 | 6/1974 | Eschenbacher et al. . |
| 3,961,541 | 6/1976 | Fund et al. . |
| 4,905,534 | 3/1990 | Andonegui . |
| 5,005,436 | 4/1991 | Brusasco ................................... 74/459 |
| 5,193,409 | 3/1993 | Babinski . |
| 5,622,082 | 4/1997 | Machelski . |
| 5,664,459 | 9/1997 | Mühleck et al. .................... 74/424.8 R |
| 5,711,188 | 1/1998 | Miyaguchi et al. . |
| 5,791,192 | 8/1998 | Lee ........................................... 74/459 |

FOREIGN PATENT DOCUMENTS

| | | |
|---|---|---|
| 0103316 | 3/1984 | European Pat. Off. . |
| 2703122A1 | 9/1994 | France . |

*Primary Examiner*—John A. Jeffery
*Assistant Examiner*—David Fenstermacher
*Attorney, Agent, or Firm*—Reising, Ethington, Barnes, Kisselle, Learman & McCulloch, P.C.

[57] ABSTRACT

A ball nut and screw system has a ball nut with adjacent helical groove turns providing a helical raceway with a screw for load bearing balls received in the raceway. The nut has an opening extending from its exterior to its interior to permit balls to be fed into the raceway. A compressible snap-in crossover, sized for compressed insertion into the opening, provides an axially diagonal, ball return passage in its underface for channeling balls from one portion of one of the adjacent turns over an intervening land surface on the screw to a portion of another turn to recirculate them. The crossover has opposed portions with nut groove entering projections thereon shaped to be snapped into the turns to define unoccupied turn portions on opposite sides of ball-occupied turn portions when the projections clear the opening upon insertion. For some purposes, wedging retainers can be received in the crossover once it is installed.

28 Claims, 4 Drawing Sheets

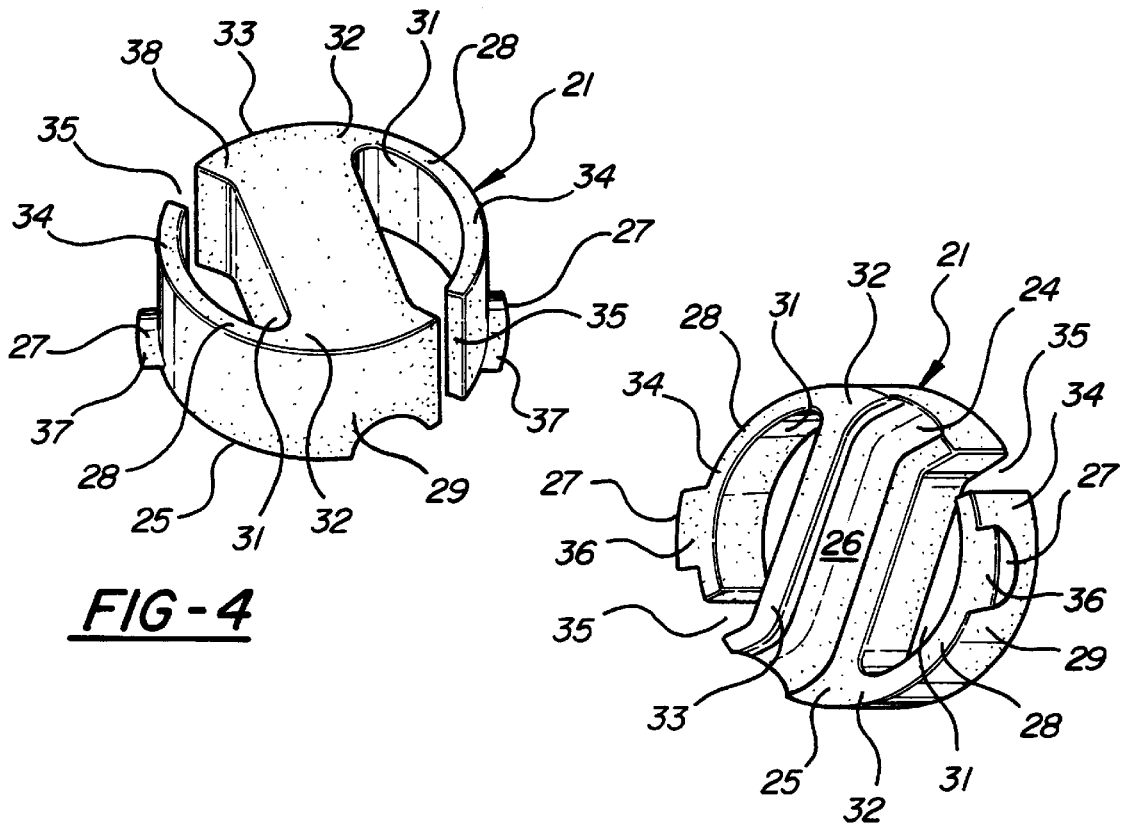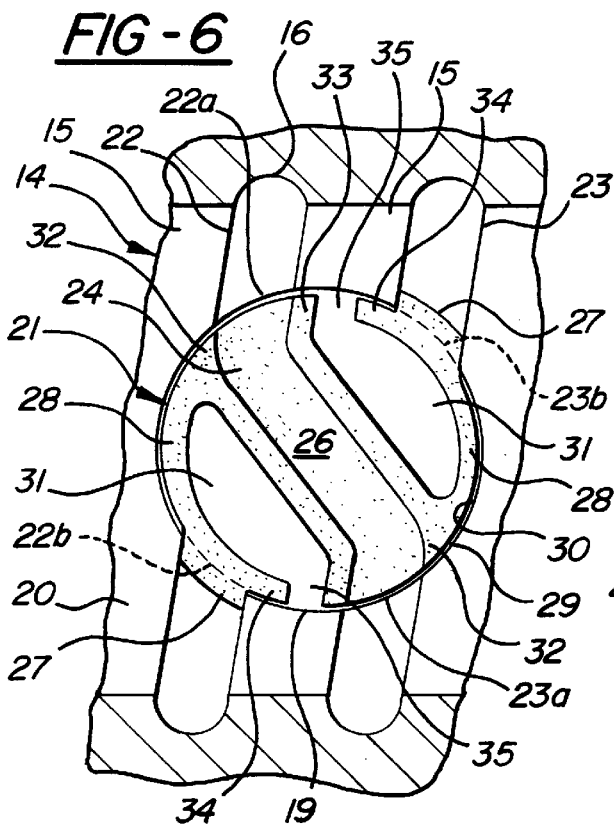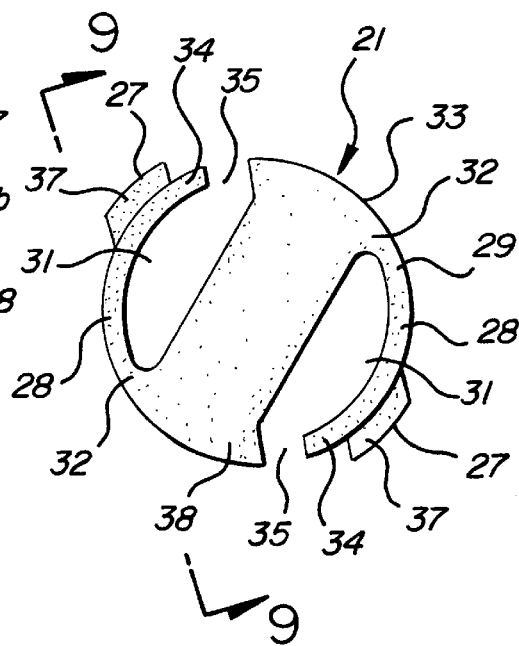

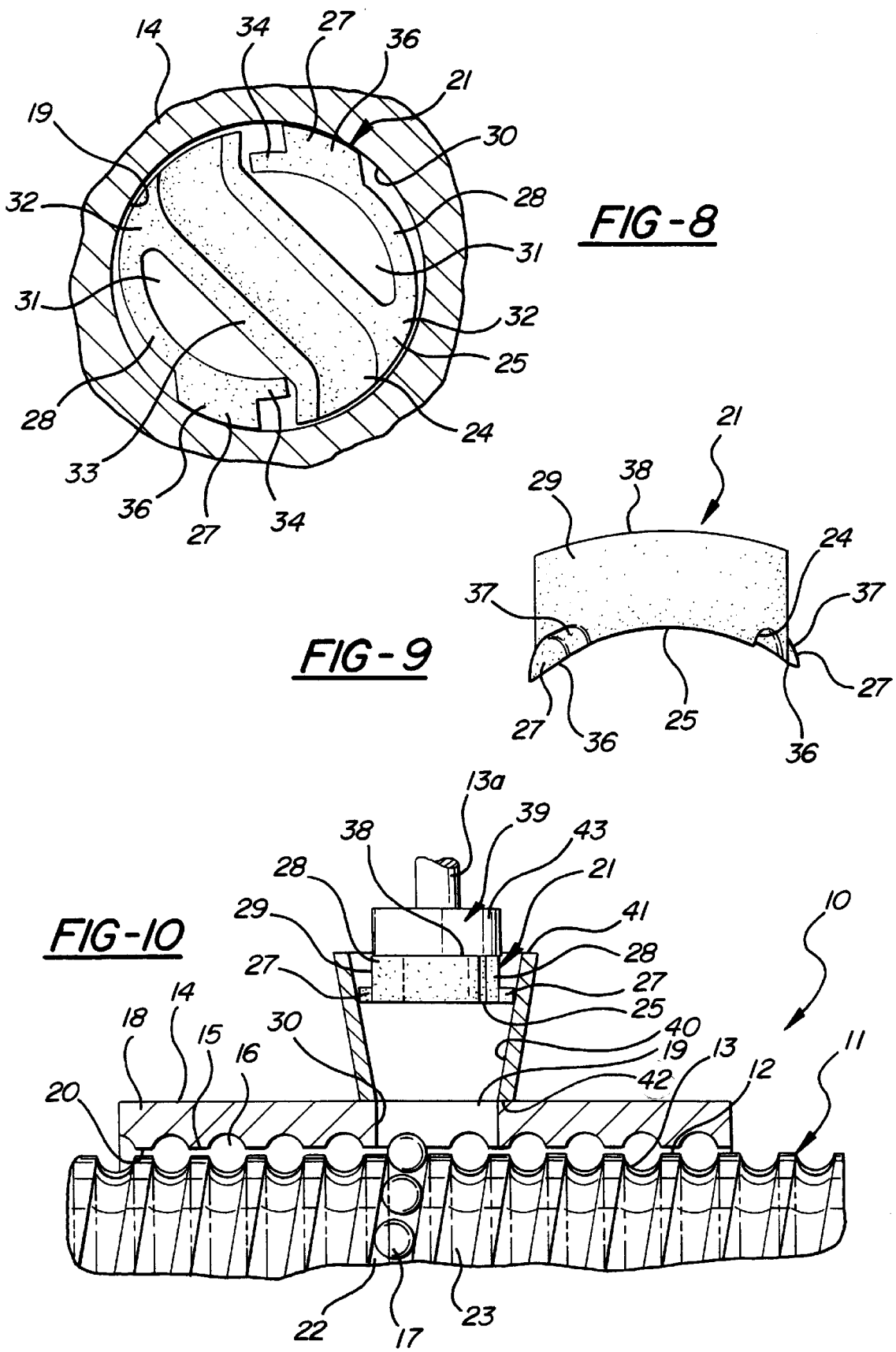

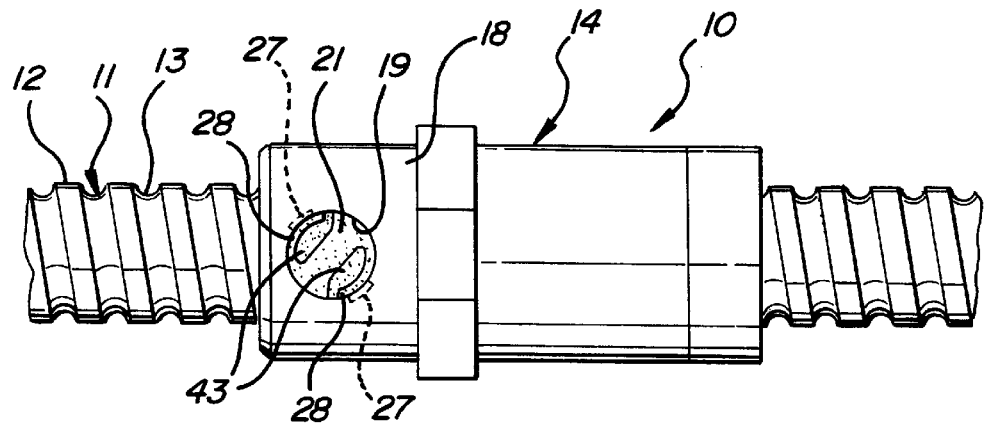
FIG-11
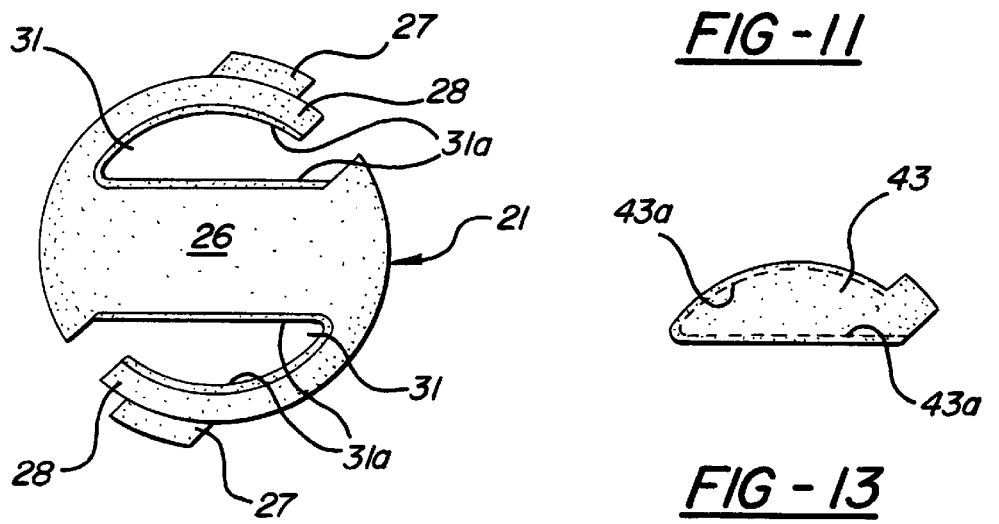
FIG-12
FIG-13
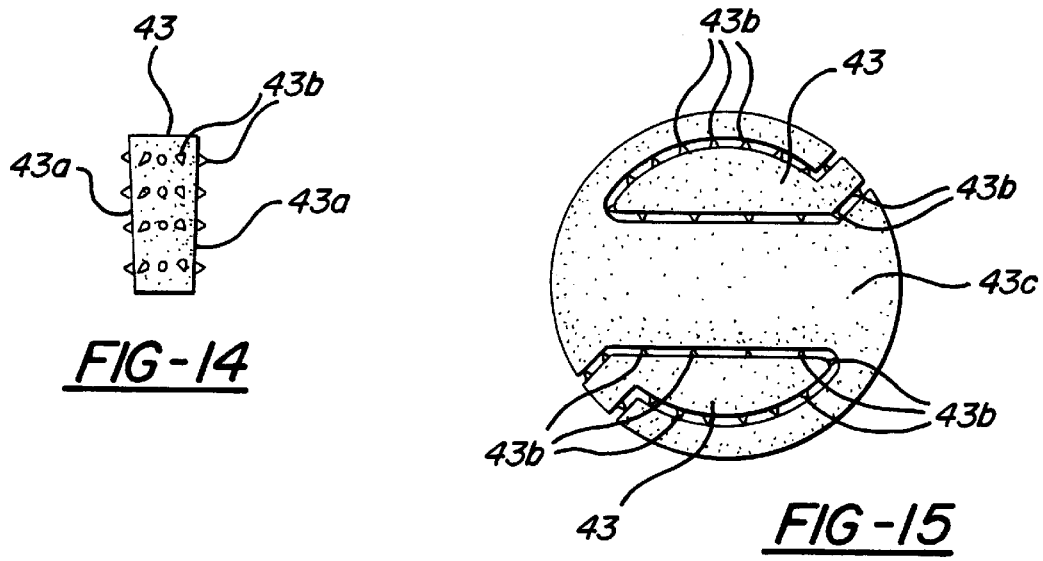
FIG-14
FIG-15

EXTERNALLY INSTALLABLE BALL RETURN CROSSOVER SYSTEMS FOR BALL NUT AND SCREW ASSEMBLIES AND METHODS OF CONSTRUCTING AND INSTALLING THEM

This application claims benefit of Provisional Application 60/085,164 May 12, 1998.

The present invention relates to ball nut and screw mechanisms wherein complemental helical grooves are formed in the nut and screw to provide a raceway for a train of recirculating abutting load bearing balls, and crossovers are provided as ball return elements.

BACKGROUND OF THE INVENTION

The aforementioned mechanisms are used widely in many fields as linear actuators and operate by converting the rotary motion of either the nut or screw into axial motion of the other. In such mechanisms, buttons or blocks are utilized in cutouts provided in the barrel of the nut to return the balls to adjacent turns of the raceway in order to effect a crossover recirculation of the ball train. A crossover button having a body with an axially diagonal crossover recirculation passage in its radially inner face which separates a portion of a pair of adjacent raceway turns into ball path portions and non-ball path portions is disclosed in U.S. Pat. No. 5,622,082, which is owned by the assignee of the present invention and incorporated herein by reference.

Previously, many crossover return buttons or blocks have been fitted into a cutout hole having vertically straight sides with a press fit. When this method of installation of the button or block is utilized, the cutout of the ball nut may be fitted with a pin of a specified diameter to provide "location" for the bottom surface of the button to prevent the button from being pressed too far into the cutout. Once installed, the locating pin needs to be removed.

Another technique uses the same general procedure but instead of a press fit, the button is provided with a slip fit which, after installation within the cutout, is retained in the proper crossover position by an adhesive.

Still another method involves the use of a stepped cutout or opening wherein the crossover button is inserted into the cutout from the interior of the nut to enable the step to locate the button so that the ball threads align with the ball passages and the crossover button.

Other crossover buttons are known which are formed with small radially projecting ears that nest in the helical grooves of the nut to properly locate the return groove of the crossover button and prevent outward removal of the button through the bore. As in the case of the provision of the stepped bores, such buttons having the radial locating ears must be installed from the interior of the nut, thereby complicating the manufacture and assembly of such ball nut and screw mechanisms.

SUMMARY OF THE INVENTION

The present invention relates to ball nut and screw assemblies which permit the load bearing balls to be loaded from the exterior of the ball nut through a cutout opening provided in the barrel of the nut and into which a crossover device formed with lateral projections carried on the ends of integral laterally inwardly flexible spring legs is installed from the exterior of the nut. The spring legs can flex laterally inwardly to enable the projections to pass through the cutout, and then spring outwardly upon exiting the cutout on the interior side of the nut, locating the projections in unoccupied adjacent helical grooves of the nut laterally inwardly of the marginal wall of the cutout, and thereby restraining the crossover from outward removal through the cutout while properly locating and aligning the passageway of the crossover with the raceway turns of the ball and nut.

A principal advantage of the present invention is that the cutout in which the crossover is installed may be a vertically straight walled opening. No special undercuts or secondary machining operations are required to accommodate the installation and retention of the crossover. The spring legs or arms of the crossover and the unoccupied groove portions of the raceway cooperate to accommodate the external insertion and provide self-locking retention of the crossover within the cutout in the nut barrel.

Accordingly, one of the principal objects of the invention is to provide an improved crossover button for ball and screw assemblies, installable into a vertically straight walled cutout opening provided in the ball nut, while the ball nut is enveloping the screw and after the balls are loaded into the raceway through the cutout opening from the exterior of the ball nut. The crossover device to be disclosed has locking lateral projections carried on spring legs that are deflectable circumferentially inwardly to enable the projections to pass through the cutout and which self-return outwardly to position the locking projections within unoccupied turn portions of the ball nut so as to prevent the radially outward removal of the crossover button. The locking projections also support a crossover passage in the button in proper alignment with the occupied turns to provide recirculating guidance to the balls.

Another object of the invention is to provide methods of construction and insertion which facilitate modern high production requirements.

THE DRAWINGS

The presently preferred embodiment of the invention is disclosed in the following description and in the accompanying drawings, wherein:

FIGS. 4 and 5 are enlarged top and bottom perspective views of the crossover button only;

FIG. 6 is an enlarged fragmentary sectional view like FIG. 2 showing further details of the crossover when it is fully installed in the cutout opening in the nut;

FIG. 7 is a top view of the crossover button only;

FIG. 8 is an enlarged fragmentary schematic interior view of the ball nut showing the spring arms of the crossover button flexed circumferentially inwardly during the insertion procedure to accommodate the locking projections within the cutout opening in the nut, the screw being omitted in the interest of clarity;

FIG. 9 is a side elevational view of the crossover button only;

FIG. 10 is an enlarged fragmentary sectional view of the ball and screw nut assembly shown together with an installation device used to install the crossover button into the cutout in the nut;

FIG. 11 is a plan view of a modified embodiment of the invention;

FIG. 12 is an enlarged top plan view of the modified crossover only;

FIG. 13 is a top plan view of one of the locking plugs forming an element of this embodiment; and FIG. 14 is a left end elevational view of the plug shown in FIG. 13.

FIG. 15 is an underplan view of a modified plug device.

DETAILED DESCRIPTION

Figure 1:
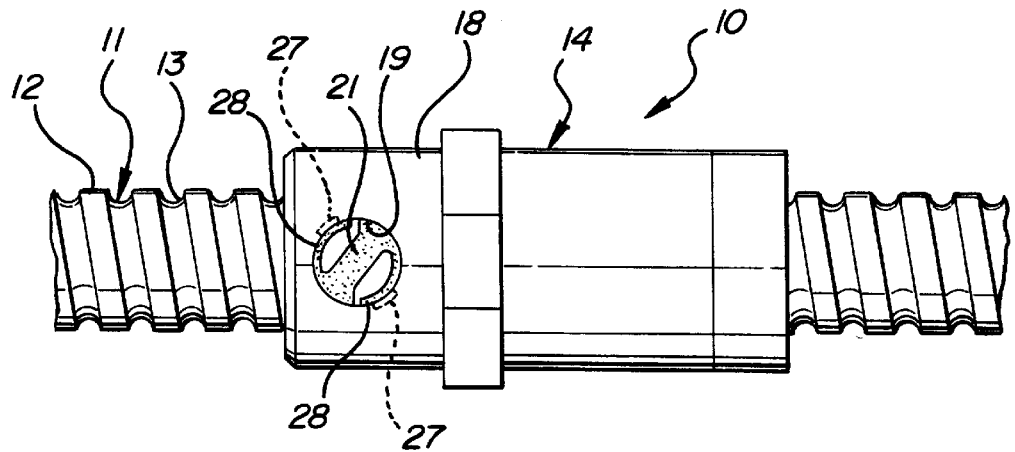
FIG. 1 is a fragmentary schematic plan view of a ball screw assembly having a crossover button system in accordance with the invention.

Referring now particularly to the drawings, a ball screw and nut mechanism or assembly, generally designated 10, is shown as including a screw shaft or screw 11 having a helical groove 13 defined between the turns of the helical land 12. A nut 14 encircles the screw 11 and includes a complemental helical land 15 and corresponding complemental helical groove 16 formed in the interior surface of the nut 14. The grooves 13, 16 are aligned to define a helical raceway R between the shaft 11 and nut 14 in which a series of load bearing balls 17 are accommodated for transmitting rotational movement of one of the components (e.g., the shaft 11) into axial linear movement of the other component (e.g., the nut 14).

Formed in the body or barrel 18 of the nut 14 is at least one, and frequently a plurality, of radial cutouts or openings 19 extending through to the longitudinal nut bore 20 in which the screw 11 is accommodated.

Figure 2:
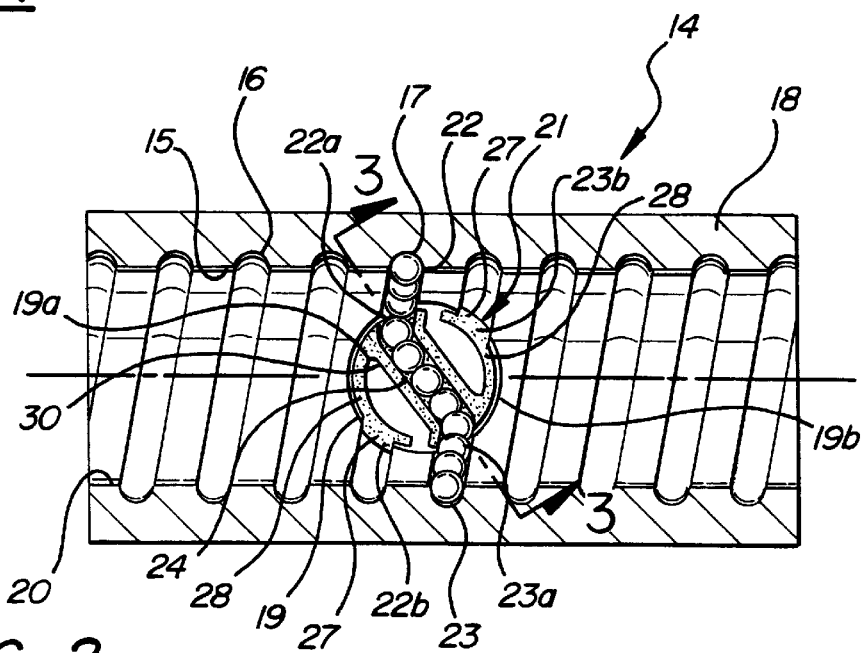
FIG. 2 is an enlarged longitudinal sectional view of a ball nut with the crossover installed therein, the screw being omitted for the sake of clarity.

Referring particularly to FIG. 2, which is a longitudinal interior sectional view through the nut 14 looking toward the opening 19, the raceway R for the balls 17 includes portions of helically or axially adjacent raceway groove turns 22, 23 formed in the screw and nut that intersect the opening 19 across from one another at locations 22a and 23a, respectively. These portions of the turns 22, 23 are connected at the locations 22a and 23a by a ball circuit passageway or recirculating arched groove 24 formed in the under surface 25 of the block 21 which serves to recirculate the balls 17 continuously through the turns 21 and 22 of the raceway as the nut or shaft rotates. The passageway 24 is generally S-shaped in configuration and communicates at one end with the turn 22 at the location 22a. It extends from there diagonally axially crosswisely of the direction of extent of the helical groove and communicates at its opposite end with the turn 23 at location 23a. As shown best in FIG. 3, the passageway 24 has a deepened central or mediate portion 26 that permits the balls 17 to travel from one turn 22 up and over the intervening screw land 12 to the other turn 23. The construction and operation of the crossover passageway 24 per se is conventional and well understood by those skilled in the art.

The turns 22 and 23 both have adjacent unoccupied portions which insect the opening 19 at locations 22b and 23b, respectively and are separated from locations 22a and 23a by the land portions 15 of the nut 14. The crossover button or block 21 is formed with lateral positioning and locking projections 27 provided on the end of resilient generally circumferential legs or extremities 28 that deflect inwardly to accommodate the passage of the projections 27 through the opening 19 from the exterior side of the nut 14, and which return laterally outwardly upon full insertion to locate the projections 27 in the unoccupied portions 22b and 23b of the turns 22 and 23. The projections 27 orient and maintain the recirculating groove 24 of the crossover 21 in proper alignment with the turn locations 22a and 23a and extend beneath the nut barrel interior surface to either side of the marginal wall of opening 19 to block the outward removal of the crossover 21 back through the opening 19, once it is installed.

Turning now to, and with particular reference to, FIGS. 4–9, further details concerning the construction and operation of the crossover button 21 of the invention are shown and will be described. As illustrated in FIGS. 5–8, the crossover button 21 has a normal or relaxed generally elliptical overall shape when viewed in plan, with the long axis of the ellipse aligned with and equiangularly connecting the locking projections 27. The opening 19 is likewise generally elliptical with the long axis of the ellipse lying along the unoccupied turn locations 22b and 23b. The crossover button 21 has a radially straight outer perimetral wall 29. The opening 19 has a corresponding radial wall 30 that is likewise radially straight and is sized approximately the same as, or slightly larger than the outer side wall 29 of the crossover 21 to provide a close, sliding clearance between the wall 29 of the crossover 21 and the wall 30 of the opening 19 when the crossover 21 is fully installed in the opening 19. The locking projections 27 extend laterally or circumferentially outwardly of the outer wall 29 to free ends which are spaced further apart from one another than the dimension of the opening 19 at the unoccupied turn locations 22b, 23b.

Provided on opposite lateral sides of the recirculating groove 24 are open regions or slots 31 having the general shape, when viewed in plan, of a segment of a circle defining a pair of arcuate leg portions that serve as the spring fingers or legs 28 of the crossover 21. The spring legs 28 are joined at base ends 32 to the central body 33 of the crossover 21 at opposite ends thereof and extend therefrom in opposite generally tangential directions to free ends 34 that are spaced circumferentially and laterally from the body 33 by gaps 35 extending from the outer wall 29 of the crossover 21 through to the open regions 31.

The crossover button 21 is fabricated of a tough, resiliently deformable material that is fairly rigid, yet sufficiently elastic to enable the spring legs or arms 28 to be deflected or deformed laterally inwardly of the open region 31 in response to application of an external, laterally inwardly directed compression force applied to the spring legs 28, and then returned to their original, nondeflected condition upon removal of such force. Suitable resilient materials include various nylons (e.g., nylon 46) and particularly glass-filled nylons with PTFE added, "Delrin", and other suitable synthetic plastics or engineered polymers that exhibit high strength, are thermally and chemically stable, can be preferably injection molded, and are sufficiently elastically deformable for operation of the spring legs 28.

As illustrated in FIGS. 4–9, the lateral projections 27 have a lower surface 36 that is flush with and contoured as an extension of the curvilinear under surface 25 of the crossover 21, and an arcuate semi-circular or semi-elliptical upper surface 37 that is spaced from the exterior top surface 38 and is of such shape and location as to nest with the unoccupied turn groove portions 22b, 23b of the nut when fully installed. The projections 27 are formed as one piece with the spring legs 28 adjacent the free ends 34 of the arms 28. As such, the projections 27 move laterally inwardly with the spring legs 28 from a position in which the arms 28 are in unflexed condition as illustrated best in FIG. 6 to an inwardly flexed or compressed condition illustrated best in FIG. 8. The inner or lower portion of cutout 19 extends through the lands 15 of the nut on axially opposite sides of the adjacent turns 22, 23, as at 19a and 19b to accommodate the legs 28 when they are permitted to return to relaxed position.

According to a method of fabricating and assembling a ball screw mechanism having such a snap-in crossover button 21 provided in the nut 14, the screw 11 and nut 14 are fabricated in the usual manner with complemental helical grooves to define the helical raceway for the load bearing balls 17. At least one of such cutouts or openings 19 is formed through the body of the nut 14, in a suitable machining operation, with the opening 19 lying axially diagonally across the unoccupied turn locations 22b and 23b shown.

The nut 14 is first telescoped into encircling position over the screw 11 and the balls 17 are then loaded into the ball circuit through the opening 19. Then, the crossover button 21 described is installed in the opening 19 with the locking projections 27 aligned with the unoccupied turn locations 22b, 23b shown. The crossover button 21 is inserted into the opening 19 from the exterior side of the nut 14, with the spring legs 28 initially compressed laterally inwardly to the deformed condition of FIG. 8, bringing the locking projections 27 within the confines of the wall 30 of the opening 19. The legs 28 in this condition exert a constant outward self-biasing force urging them outwardly toward the unflexed position of FIGS. 6 and 7.

FIG. 10 illustrates a tool or fixture device, generally indicated at 39, that may be employed to accommodate the installation of the crossover 21 in the opening 19. The tool device 39 incorporates a tubular member having an inner wall of generally elliptical cross-section 40 that tapers uniformly from a larger upper loading end 41 to a relatively smaller lower end 42. The upper end 41 is sized to accept the crossover 21 in its unflexed condition. The elliptical lower end 42 is sized to be about equal in dimension to the opening 19 and angularly aligns the crossover and its locking projections 27.

In use, the lower end 42 of the tool 39 is aligned with the opening 19 and the crossover 21 is forced downwardly through the tool 39, whereupon the tapering walls 40 cam the spring arms 28 inwardly to compress and guide the crossover 21 into the cutout opening 19. A pushing ram 43, such as a conventional air cylinder having a piston rod 43a, or a hand tool, may be employed in an automated assembly procedure to engage and force the crossover 21 downwardly through the tool sleeve 40 sufficiently to retain the crossover 21 in place within the opening 19. Upon full insertion of the crossover 21 into the opening 19, the projections 27 are caused to exit the opening 19 and snap into the unoccupied portions 22b, 23b of the turns 22 and 23 as the spring legs 28 self-return outwardly to the nonflexed condition of FIG. 6. When fully installed, the projections 27 thus extend outwardly beyond the marginal wall 30 of the opening 19 and prevent the crossover 21 from both twisting and moving back out of the opening 19. The close conformance of the shape of the projections 27 and that of the unoccupied groove portions 22b and 23b of the turns 22 and 23 further acts to locate and maintain the ball circulating groove 24 of the crossover 21 in alignment with the active ends 22a and 23a of the turns 22 and 23. Alternatively, the crossover could be compressed at a remote location and retained in compressed condition so that it could be inserted into the cutout 19.

Figure 3:
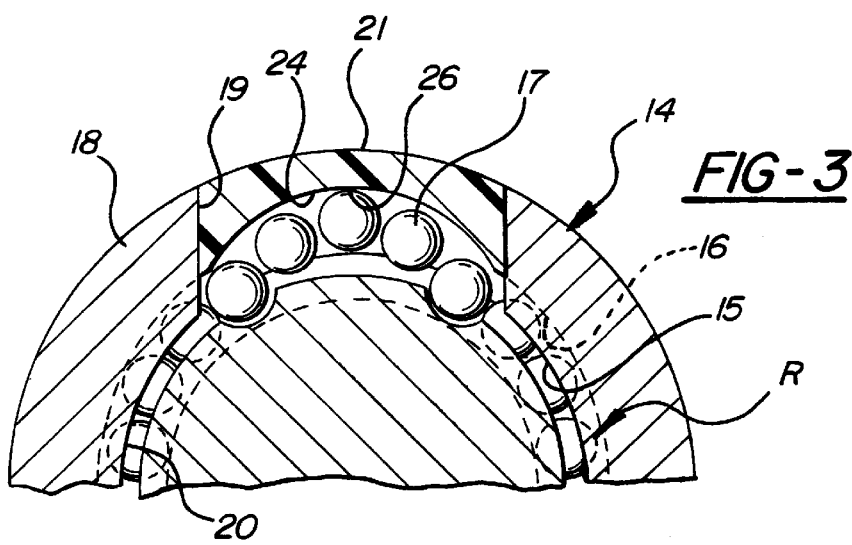
FIG. 3 is an enlarged fragmentary cross-sectional view taken generally along the lines 3—3 of FIG. 2.

It will thus be appreciated that the crossover 21 not only permits the balls 17 to be loaded through the opening 19 of the nut 14 in position on the screw 11, but also provides external, snap-in installation of the crossover 21 in an opening 19 having a vertically straight marginal side wall 30 (FIG. 3). The crossover button 21 takes advantage of the unoccupied portions 22b, 23b of the nut 14 as undercut regions adjacent the opening 19 into which the spring-biased locking projections 27 can snap, once fully installed in the opening 19.

It will be appreciated that two or more of such crossover buttons 21 can be provided in the nut 14 to provide two or more independent ball trains and that they will be constructed and operate in the same manner. It will be also appreciated that the crossover button 21, while preferably elliptical, could also be circular, or have any desired shape, so long as the locking projections 27 are able to snap into the unoccupied portions 22b and 23b of the ball race turns 22 and 23 when fully installed.

In another embodiment of the invention which is depicted in FIGS. 11–14, wedging plugs or retainers 43 are provided to fill the slots or openings 31 in the crossover 21, retard lubrication leakage, and resist the entrance of dirt and other foreign matter. In this modification, the marginal walls of the slots 31 are slightly tapered from top to bottom as at 31a. A matching taper 43a is provided on the side walls of the plug which extend from one end of slots 31 to the other, and raised portions or barbs 43b may also be provided over the tapered surfaces in vertically and horizontally spaced relation to bite into the adjacent side walls of the crossover 21. The taper can be very slight, i.e., in the neighborhood of one degree. Once the crossover 21 is fully inserted the plugs 43 are inserted, either sequentially or simultaneously, and force fit into position to fulfill the important functions mentioned. The wedge plugs 43 can be constructed of steel or another material which is harder than the material from which the crossover 21 is fabricated.

In a modified embodiment the same plugs 45 can be integrated with a cap or cap portion 43c as shown in FIG. 15. The cap 43c and legs 43 can be molded of a suitable synthetic plastic material in one piece, and legs 43 can be simultaneously inserted after the crossover 21 is fully inserted.

It is to be understood that other embodiments of the invention which accomplish the same function are incorporated herein within the scope of ultimately allowed patent claims.

I claim:

1. In a ball nut and screw system:
   a. a tubular ball nut having a helical groove with adjacent turns on its interior surface;
   b. a ball screw formed to provide, with said nut, a helical raceway;
   c. load bearing balls for said raceway disposed to occupy portions of said turns;
   d. said nut having an opening extending through said nut from the exterior thereof to the interior thereof to permit balls to be fed into ball-occupied portion of said turns through said opening;
   e. a compressible snap-in crossover, sized for compressed insertion into said opening, providing an axially diagonal, ball return passage in its underface for channeling said balls from one portion of one of said adjacent turns over an intervening land surface on the screw to a portion of the other turn to recirculate them, and having opposed portions with nut groove entering projections thereon shaped to be snapped into said turns and define unoccupied turn portions on opposite sides of said ball-occupied portions when said projections clear said opening upon insertion.

2. The system of claim 1 wherein said crossover comprises a body portion with said passage, having oppositely disposed and extending resilient leg portions constituting said opposed portions extending from opposite ends and sides of said body portion in laterally outwardly angled directions to define a lateral space on each side of said body portion permitting lateral compression of said leg portions toward said body portion, said nut groove entering projections being provided perimetrally on said leg portions.

3. The system of claim 2 wherein said opening is generally elliptical in cross-section and is disposed diagonally axially across the direction of extent of said helical groove; and said crossover is generally ellipsoidal with said long axis of the generally ellipsoidal crossover extending equi-angularly through said nut groove entering portions.

4. The system of claim 2 wherein the crossover has radially inner and outer ends and the inner end of the crossover is arcuate to conform generally to the interior wall of said nut, and said nut groove entering projections extend angularly from the leg portions at a spaced distance from the outer end of the crossover to move under said opening and permit lateral reexpansion of said leg portions when said crossover is fully inserted.

5. The system of claim 1 wherein said crossover includes a body portion with a curvilinear inner end under surface in which said passage is provided and said opposed portions connect with said body portion and have said nut groove entering projections as lateral projections at their inner ends; said projections in normal position defining a dimension with said body portion which will not enter said opening and requiring lateral inward movement toward said body portion to do so.

6. The system of claim 5 wherein said crossover has an upper surface conforming to said nut outer surface to function as a continuation thereof and said groove entering projections are spaced a predetermined distance radially inwardly therefrom so as to clear said opening when the crossover is fully inserted and move laterally under the marginal edge of said opening to snap into position.

7. The system of claim 6 wherein said groove entering projections are angularly positioned oppositely on said opposed portions in accordance with the pitch of said turns to snap into said nut grooves, said groove entering projections being of generally semi-circular cross section to substantially fill said nut groove.

8. The system of claim 7 wherein said leg portions and groove entering projections are in substantially relaxed condition when said projections are received in said nut grooves.

9. The system of claim 2 wherein wedge shaped plugs are provided between said leg portions and body portion to aid in locking said crossover in inserted position.

10. The system of claim 9 wherein said plugs and crossover leg portions and body portions have adjacent side walls with matching tapers and said plugs are of the shape of said lateral spaces to close them.

11. The system of claim 10 wherein said plugs have vertically spaced projections thereon to bite into said leg portions and body portion of the crossover.

12. The system of claim 11 wherein said plugs are integrated with a cap.

13. A method of constructing a ball nut and screw system having a tubular ball nut with an internal helical groove having adjacent turn, a ball screw having a helical groove with an adjoining land formed to provide, with said nut, a helical raceway, load bearing balls for said raceway disposed to occupy portions of said turns, the nut having an opening extending through said nut radially from the exterior thereof to the interior thereof to permit balls to be fed into a ball-occupied portion of said turn through said opening; and a compressible snap-in crossover, sized for compressed insertion into said opening, providing an axially diagonal, arched ball return passage in its underface for channeling said balls from one portion of one of said adjacent turns over an intervening land surface on the screw to a portion of the other turn to recirculate them, and having opposed portions with interiorly positioned nut groove entering projections thereon shaped to be snapped into said turns and define unoccupied turn portions on opposite sides of said ball occupied portion when said projections clear said opening upon insertion;

the steps of:

(1) compressing said crossover laterally and inserting it into said opening in a compressed state in which said projections engage the marginal wall of said opening;

(2) moving said compressed crossover generally radially inwardly in said opening to a position in which said projections clear the opening, and permitting said crossover to expand laterally to cause said projections to move laterally to a position in which they underlie the marginal edge of said opening and snap into the adjacent turns.

14. The method of claim 13 wherein said crossover is provided as a body portion with said passage having oppositely disposed and extending resilient leg portions extending from opposite ends and sides of said body portion in a laterally outwardly angled direction to define a lateral space on each side of said body portion permitting lateral compression of said leg portions toward said body portion, said nut groove entering projections being provided perimetrally on said leg portions, and said compression step is effected by deforming said leg portions laterally inwardly.

15. The method of claim 13 wherein said crossover is provided as having a body portion with a curvilinear lower under surface in which said passage is formed, and said opposed portions connect with said body portion and have said nut groove entering portions as lateral projections at their interior ends.

16. The method of claim 14 wherein, following insertion of said crossover, wedge shaped plugs are inserted between said legs and body portion to aid in locking said crossover in position.

17. The method of claim 16 comprising providing the side walls of said plugs and crossover legs and body portion with a matching taper, and providing said plugs in the shape of said lateral spaces to close them, and with vertically spaced projections thereon to bite into said legs and body portion of the crossover when the plugs are inserted.

18. The method of claim 16 comprising providing said plugs as an integrated structure dependent from a cap and inserting them simultaneously.

19. The method of claim 14 including the step of, first of all, providing said opening through said nut from exterior to interior to cut out a portion of the axially adjacent land of each of said turns in a curvilinear path to accommodate said oppositely extending leg portions of the crossover when the leg portions are permitted to expand.

20. A method of inserting a crossover in a ball nut and screw system comprising a tubular ball nut having a helical groove with adjacent turns on its interior surface; a ball screw formed to provide, with said nut, a helical raceway; and load bearing balls for said raceway disposed to occupy portions of said turns; said nut having an opening extending through said nut from the exterior thereof to the interior thereof to permit balls to be fed into a ball-occupied portion of said turn through said opening;

the steps of:

a. laterally compressing a compressible snap-in crossover, sized for compressed insertion into said opening, which provides an axially diagonal, ball return passage in its interior for channeling said balls from one portion of one of said adjacent turns over an intervening land surface on the screw to a portion of the other turn to recirculate them, and which has opposed portions with nut groove entering projections on their interior ends at a predetermined location shaped to enter said turns to define unoccupied turn portions on opposite sides of said ball-occupied portion when said projections clear said opening; and inserting said compressed crossover into said opening and pushing it inwardly until said projections clear said opening and expand laterally to snap under its marginal edge.

21. The method of claim 20 wherein said crossover is provided as a body portion with said passage, having oppositely disposed and extending resilient leg portions extending from opposite ends and sides of said body portion in a laterally outwardly angled direction to define a lateral space on each side of said body portion permitting lateral compression of said leg portions toward said body portion, said nut groove entering projections being provided perimetrally on said leg portions, and compressing said leg portions to compress said crossover and permit entrance of the crossover into said opening.

22. The method of claim 21 comprising inserting wedge shaped plugs simultaneously between said leg portions and body portion to aid in locking said crossover in inserted position.

23. A laterally compressible crossover for a ball nut and screw system comprising a tubular ball nut having a helical groove with adjacent turns on its interior surface, a ball screw formed to provide, with said nut, a helical raceway, load bearing balls for said raceway disposed to occupy portions of said turns, said nut having an opening extending through said nut from the exterior thereof to the interior thereof to permit balls to be fed into a ball-occupied portion of said turn through said opening, said crossover being sized for compressed insertion into said opening, and axially diagonal, arched ball return passage in its underface for channeling said balls from one portion of one of said adjacent turns over an intervening land surface on the screw to a portion of the other turn to recirculate them;

said crossover having opposed resilient compressible parts with nut groove entering projections thereon shaped to be snapped into said turns and define unoccupied turn portions on opposite sides of said ball-occupied portion when said projections clear said opening upon insertion.

24. The crossover of claim 23 wherein said crossover has exterior and interior ends and comprises a body portion with said passage, having oppositely disposed and extending resilient leg portions constituting said compressible parts extending from opposite ends and sides of said body portion in a laterally outwardly angled direction to define a lateral space on each side of said body portion permitting lateral compression of said leg portions toward said body portion, said nut groove entering projections being provided perimetrally on said leg portions at their interior ends.

25. The crossover of claim 23 wherein the interior end of the crossover is arcuate to confirm generally to the interior wall of said nut, and said nut groove entering projections project from said compressible parts at a spaced distance from the exterior portions thereof to move under said opening and permit lateral reexpansion of said compressible parts when said crossover is fully inserted.

26. The crossover of claim 24 which includes wedge shaped plugs provided between said leg portions and body portion to aid in locking said crossover in inserted position.

27. The crossover of claim 26 wherein said plugs and crossover leg portions and body portion have adjacent side walls with a matching taper, and said plugs are of the shape of said lateral spaces to close them and have vertically spaced projections thereon to bite into said leg portions and body portion of the crossover.

28. The crossover of claim 26 wherein said plugs depend integrally from a cap portion.

* * * * *